United States Patent [19]

King, II

[11] 4,058,380

[45] Nov. 15, 1977

[54] CARBON CELL

[75] Inventor: Lamar L. King, II, Garden City, Mich.

[73] Assignee: Ford Motor Company, Dearborn, Mich.

[21] Appl. No.: 337,517

[22] Filed: Mar. 2, 1973

[51] Int. Cl.[2] .............................................. B01D 53/04

[52] U.S. Cl. ........................................ 55/387; 55/389; 55/DIG. 28; 55/DIG. 30

[58] Field of Search .................... 55/DIG. 30, 74, 387, 55/389; 210/188, 189

[56] References Cited

U.S. PATENT DOCUMENTS

| | | | |
|---|---|---|---|
| 2,469,842 | 5/1949 | Paquin et al. | 55/387 X |
| 3,646,731 | 3/1972 | Hansen | 55/387 X |

*Primary Examiner*—Charles N. Hart
*Assistant Examiner*—Ferris H. Lander
*Attorney, Agent, or Firm*—Joseph W. Malleck; Keith L. Zerschling

[57] ABSTRACT

An evaporative emission control system is disclosed having a bed of activated carbon effective to adsorb or collect fuel vapors from both the fuel tank and/or an automotive carburetor; the vapors are desorbed or purged back into the engine upon subsequent and specific degree of engine operation. The bed is provided with one or more baffles to route the vapors through the full extent of the activated carbon for improving efficiency of emission control.

1 Claim, 2 Drawing Figures

CARBON CELL

BACKGROUND OF THE INVENTION

In addition to air pollution derived from auto engine exhaust gases and crank case vapors, it is known that vapors from gasoline storage tanks and carburetors contribute in some degree to atmospheric contamination. With respect to the carburetor, there is a desire to obtain proper gasoline flow from the float bowl to a carburetor mixing chamber and this requires suitable vent means from the float bowl to maintain atmospheric pressure therein. In one approach, prevention of excessive vapor pressure in the float bowl is provided by a vent line from the bowl directly to the atmosphere (such an arrangement is referred to as an external vent system). Another approach is to use a direct line or passageway from the inside of the float bowl to the air intake portion of the carburetor, upstream of the venturi mixing section, such as at the air cleaner (this is referred to as an internal system).

Fuel vapor is released to the atmosphere particularly during an engine condition known as "hot soak"; the evaporation losses of gasoline from the carburetor float bowl after the engine is stopped and during hot weather periods, can be quite appreciable.

The principal approach of the prior art has been to eliminate such vapor releases by providing a hydrocarbon absorption bed to pick up gasoline vapors from the carburetor or storage system and retain such vapors in the bed during idle or slow engine speed conditions, as well as during hot soak conditions. The vapors are desorbed from the device during higher speed engine operation. The transition from absorption to desorption is brought about by suitable valve means incorporated into the system.

The interposition of absorption material, in a line communicating with such vapors, does not always insure that optimum or effective storage of the vapors will take place during absorbing conditions. The introduction of vapors to one side of an absorption bed will not necessarily permit the vapors to seek penetration and effectively move throughout the entire absorption bed. One reason for this is that there must be access to an air vent for purging. Typically, this vent is open continuously to avoid the cost of extra equipment. Such vent must be located on the opposite side of the bed to eliminate short circuiting of the incoming vapors directly to the vent. As a result, the column of carbon between the inlet and vent becomes the determining factor in the collecting capacity of the bed. Thus, an increase in other dimensions of the bed has little effect on its absorbing capability. Efficiency of such absorption system is decreased accordingly.

SUMMARY OF THE INVENTION

It is a primary object of the invention to provide a vapor emission control which utilizes an absorption bed for gasoline vapors and which is arranged to insure that substantially the entire body of absorption material is capable of acting upon said vapors.

One specific feature is employment of a baffle to substantially divide the carbon bed into two connecting portions; a fuel vapor inlet is placed adjacent the connection between said portions. An air inlet and vapor outlet is located remotely from the vapor inlet so as to cause the entire body of carbon to act on the vapors before release.

DETAILED DESCRIPTION

Figure 2:
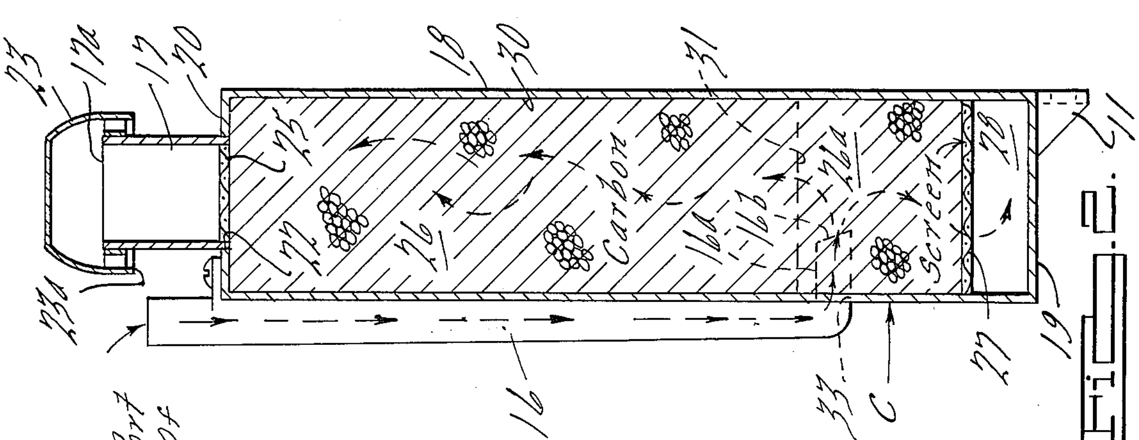
FIG. 2 is a cross-sectional view of a portion of the device of FIG. 1 taken substantially along line 2—2.
Figure 1:
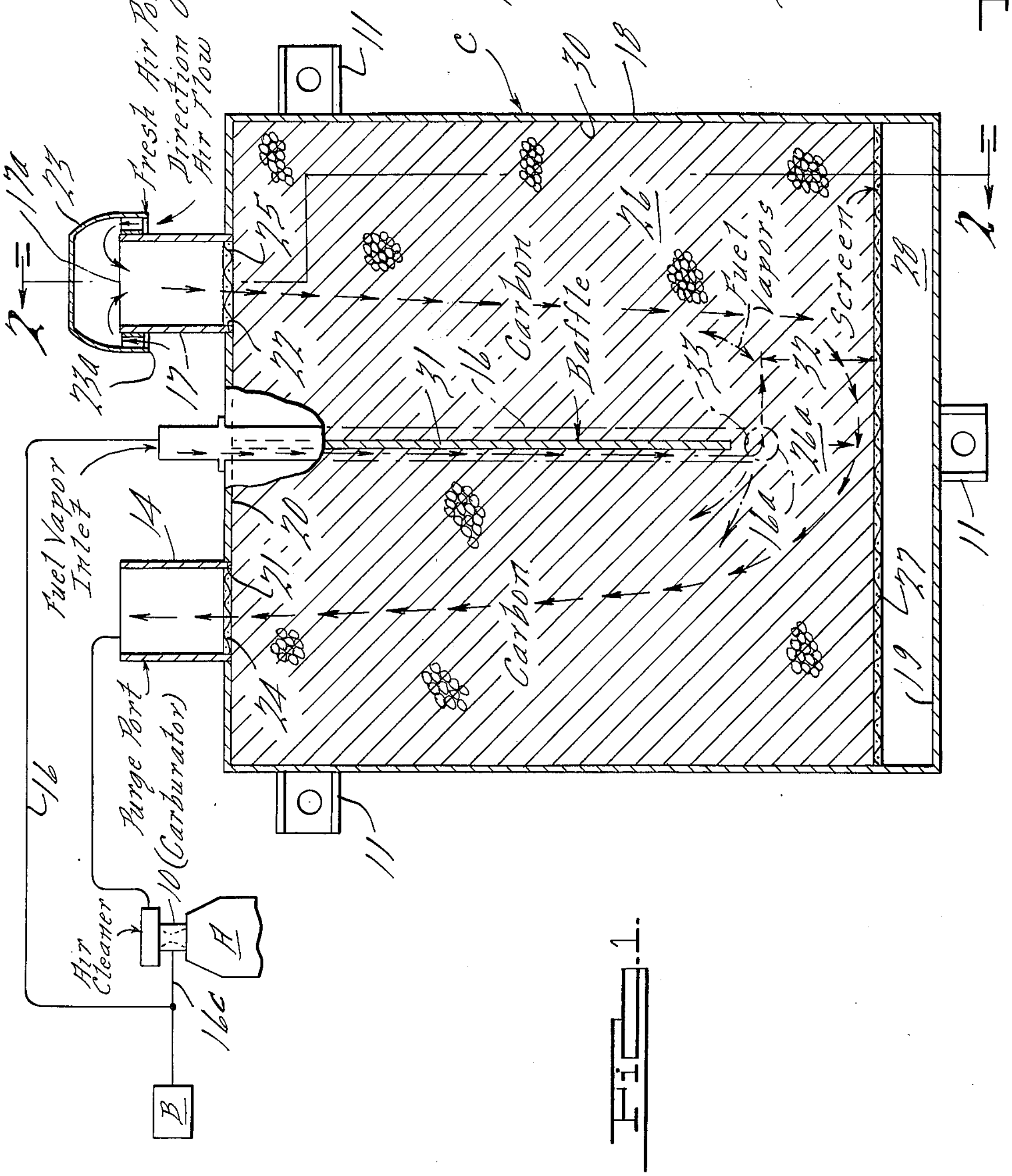
FIG. 1 is a schematic representation of an entire vapor emission control system for a typical internal combustion engine showing the absorption-desorption device as enlarged and in side elevation.

FIG. 1, illustrates schematically a vapor emission control system particularly embodying the inventive absorption-desorption device of this invention. An absorption-desorption device A (or vapor collecting means) is arranged to receive vapors from both a gasoline tank or reservoir B as well as from the carburetor 10 forming part of an engine assembly A.

The vapor collecting means C particularly comprises an impervious canister or cell 18 defining an interior chamber 30. The cell is closed at an upper end by a wall 20 having a plurality of ports 21 and 22; the cell is closed at an opposite end by an integral end wall 19. A bed 26 of vapor absorption material is entrained within the cell to substantially occupy the interior of chamber 30. The bed is placed in juxtaposition to the upper end wall 20 and is slightly spaced from the bottom end wall 19 by a screen 27 serving to define an air space 28. A conduit 16 extends exteriorly alongside the cell to pass through an inlet opening 33 located immediately adjacent the bottom of a baffle 31 serving to divide the bed 26. A portion **16*a* of the conduit extends into the bed to teminate at 16*b* at a location generally centrally with respect to the width of the cell. The conduit 16 collects fuel vapors from gasoline tank B; if desired, an additional passage 16*a* may be employed to collect fuel vapors from the carburetor 10. A short conduit 17 is connected to port 22 and has one end 17*a* covered by a protective closure 23 effective to admit ambient air from under the lip 23*a* of the closure. A conduit 14 connects with port 21 and is in communication with one side of the engine air cleaner 11 so that upon a predetermined degree of engine operation, vacuum in the air cleaner will purge the cell and its carbon bed 26. Screens 24 and 25 are interposed respectively at the mouth of each of the conduits 14 and 17 so as to cooperate in retention of the absorption material within the cell. Brackets 11** are shown which facilitate mounting of the cell.

As an important feature of this invention, is the use of one or more baffles 31 here extending from the upper wall 20 substantially down the full height of the bed 26, as well as across the entire width of chamber 30, to terminate at a position spaced a distance 32 from screen 27. The baffle 31 here substantially divides bed 26 into two portions connected by a bed portion **26*a* immediately beneath the baffle. As a result, fuel vapors entering the chamber 30 from conduit 16 enter the connecting portion 26*a*** and generally equally penetrate upwardly into the divided portions of the bed. The bottom portion of the bed of absorption material is thus positively traversed by the accumulating vapors. Accumulating vapors are routed through the full extent of the bed before breakthrough (that time when the carbon can no longer contain vapor).

During low speed and idle conditions of the engine, including a hot soak cycle, conventional controls may be employed to prevent purging but admit fuel vapors to the cell through conduit 16. The same conventional controls can provide for purging at a predetermined engine condition by allowing vacuum from the air cleaner to suck the vapors through port 21 into conduit 14 and thence to be reintroduced to the mixture admitted for combustion in engine A.

In automotive applications, such baffle can triple the efficiency of the carbon as compared to the canister design now in use. However, further improvement can be obtained by varying the size, shape and volume of chamber 30 and by varying the number of baffles or their size (either singly, in series, or in parallel connection for multiple use), or their shape (square, rectangular, round, etc.). Breakthrough of the vapors back into the air intake is virtually prevented for a given body of carbon material sized with respect to the evaporative capability of a specific engine and tank assembly.

I claim:

1. A hydrocarbon vapor adsorption-desorption device comprising:

a. a cell having an interior chamber with opposite end walls, one of said end walls having a plurality of ports with at least one port for receiving ambient air and another port for purging vapors, b. a bed of vapor adsorbing material in said chamber interposed between said end walls, c. at least one baffle extending from said one end wall toward said opposite end wall in a manner to substantially separate without completeness said bed into longitudinally divided portions with said ports on opposite sides thereof, and d. at least one port for introducing fuel vapors to said bed immediately beneath said baffle whereby said vapors migrate generally equally into both said bed portions for collection and for subsequent purging.

* * * * *